United States Patent
Ubeda Castellanos et al.

(10) Patent No.: US 9,817,103 B2
(45) Date of Patent: Nov. 14, 2017

(54) POSITION ADJUSTMENT IN MOBILE COMMUNICATIONS NETWORKS

(71) Applicant: Telefonaktiebolaget L M Ericsson (publ), Stockholm (SE)

(72) Inventors: Carlos Ubeda Castellanos, Madrid (ES); Nizar Faour, Malaga (ES); Javier Romero Garcia, Malaga (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/517,635

(22) PCT Filed: Oct. 9, 2014

(86) PCT No.: PCT/EP2014/071664
§ 371 (c)(1),
(2) Date: Apr. 7, 2017

(87) PCT Pub. No.: WO2016/055113
PCT Pub. Date: Apr. 14, 2016

(65) Prior Publication Data
US 2017/0254878 A1 Sep. 7, 2017

(51) Int. Cl.
*H04W 24/00* (2009.01)
*G01S 5/02* (2010.01)
*H04W 64/00* (2009.01)

(52) U.S. Cl.
CPC .......... *G01S 5/0278* (2013.01); *G01S 5/0252* (2013.01); *H04W 64/00* (2013.01)

(58) Field of Classification Search
CPC ........ G01S 5/0278; G01S 5/0252; G01S 5/02; H04W 64/00
(Continued)

(56) References Cited

U.S. PATENT DOCUMENTS

| | | | |
|---|---|---|---|
| 5,293,642 A | 3/1994 | Lo | |
| 5,418,843 A * | 5/1995 | Stjernholm | H04W 16/18 379/111 |

(Continued)

FOREIGN PATENT DOCUMENTS

| | | |
|---|---|---|
| WO | 03023443 A2 | 3/2003 |
| WO | 2015135581 A1 | 9/2015 |

OTHER PUBLICATIONS

Komulainen, Arwid, "Geo-localization Performance in LTE Release-8", Ericsson Report, Jun. 1, 2012, 1-56.
(Continued)

*Primary Examiner* — Marceau Milord
(74) *Attorney, Agent, or Firm* — Murphy, Bilak & Homiller, PLLC

(57) ABSTRACT

The invention relates to a method for determining an adjusted position (63, 64) of a mobile entity in an area (90) of a mobile communications network based on a reference position (61, 62) of the mobile entity in the area (90), the area being divided into different pixels (91). The method comprises determining the reference position (61, 62) of the mobile entity in the area (90), determining, for each pixel (91) of the area (90), a predicted signal level of a radio frequency field of the mobile communications network for the mobile entity, determining, for each pixel (91) of the area (90), a mobile traffic density indicating an expected density of the mobile traffic of the mobile communications network in the area, and determining, for the area (90), a probability matrix (200) of the area based on the reference position (61, 62), the predicted signal level and the mobile traffic density, the probability matrix indicating a likelihood that the mobile entity is located in the corresponding pixel of the area. The method further comprises selecting one of the pixels for the mobile entity based on the probability matrix (200), the (Continued)

selected pixel corresponding to the adjusted position (63, 64) of the mobile entity in the area.

18 Claims, 12 Drawing Sheets

(58) Field of Classification Search
USPC .................. 455/456.1, 404.2, 456.2, 456.3
See application file for complete search history.

(56) References Cited

U.S. PATENT DOCUMENTS

| | | | | |
|---|---|---|---|---|
| 5,465,390 | A * | 11/1995 | Cohen | H04W 16/18 455/423 |
| 7,346,359 | B2 * | 3/2008 | Damarla | G01S 5/0252 455/404.2 |
| 7,956,808 | B2 * | 6/2011 | Boyer | G01S 5/0278 342/451 |
| 7,969,311 | B2 * | 6/2011 | Markhovsky | G01S 3/74 235/375 |
| 8,295,853 | B2 | 10/2012 | Heikkilä et al. | |
| 8,626,191 | B2 * | 1/2014 | Siomina | G01S 5/0252 455/410 |
| 8,717,193 | B2 * | 5/2014 | Velusamy | G08G 1/0112 340/425.5 |
| 9,594,149 | B2 * | 3/2017 | Siomina | G01S 5/0252 |
| 9,699,607 | B2 * | 7/2017 | Markhovsky | H04W 4/023 |
| 2009/0157342 | A1 | 6/2009 | Zhang et al. | |
| 2010/0164781 | A1 * | 7/2010 | Boyer | G01S 5/0278 342/165 |
| 2013/0343272 | A1 * | 12/2013 | Zhang | H04W 24/02 370/328 |
| 2014/0094208 | A1 * | 4/2014 | Egner | H04W 72/085 455/513 |
| 2016/0154408 | A1 * | 6/2016 | Eade | G09B 29/007 701/523 |

OTHER PUBLICATIONS

Chen, Zhongqiang et al., "Radio-Wave Propagation Prediction using Ray-Tracing Techniques on a Network of Workstations (NOW)*", Oct. 2004, 1-39.

Milioris, Dimitris et al., "Low-dimensional signal-strength fingerprint-based positioning in wireless LANs", Ad Hoc Networks, Jan. 2012, 1-15.

Roxin, A. et al., "Survey of Wireless Geolocation Techniques", IEEE Globecom Workshops, Nov. 26-30, 2007, 1-9.

Turin, George L., "The Effects of Multipath and Fading on the Performance of Direct-Sequence CDMA Systems", IEEE Transactions on Vehicular Technology, vol. VT-33, No. 3, Aug. 1984, 213-219.

Ubeda, Carlos et al., "Evaluation of a Time-Delay based Geolocation Algorithm in Real UMTS Networks", 2010 Fifth International Conference on Broadband and Biomedical Communications (IB2Com), Dec. 15-17, 2010, 1-4.

Unknown, Author, "Ericsson Mobility Report", Interim Update, Aug. 2013, 1-4.

* cited by examiner

| Clutter Type | Loss [dB] | Weight [-] |
|---|---|---|
| Water | 0 | 0 |
| Barren | 0 | 5 |
| Forest | 15 | 10 |
| Suburban | 20 | 100 |
| Urban | 25 | 175 |
| Core Urban | 25 | 300 |
| Industrial | 15 | 100 |
| Street | 0 | 80 |

Fig. 9

POSITION ADJUSTMENT IN MOBILE COMMUNICATIONS NETWORKS

TECHNICAL FIELD

The present invention relates to a method for determining an adjusted position of a mobile entity in an area of a mobile communications network and to a corresponding position adjusting unit. Furthermore, a computer program and a computer program product are provided.

BACKGROUND

Traffic in mobile communications networks is expected to exponentially increase during the following years. However, this data boost is not equally distributed, as FIG. 2 illustrates. There are low-density areas 21, where the main target is to improve coverage by Radio Frequency (RF) optimization, while in high-density areas 22 reliable detection of coverage holes is essential to place low-power nodes that improve capacity, which is usually known as Small Cells Design. Not only, but especially in this latter scenario, high accuracy is required.

Operators traditionally have performed these planning and optimization tasks by means of tools that mainly rely on pathloss models, sometimes adjusted by network counters. However, results have been found not accurate enough due to the complexity of capturing the actual propagation patterns, even using ray-tracing. An alternative is the use of drive-tests as disclosed in US 2009/0157342 A1 to sample the actual user experience. Unfortunately, this option, apart from being time-consuming and costly, is very limited in indoor environments, where most of the traffic is, particularly in dense urban areas.

To overcome these limitations, current techniques are based on positioned RF data, either provided by the user with the help of Global Positioning System (GPS) or any other similar technology, i.e. mobile-based positioning, or taken from traces collected by the network, i.e. network-based positioning. However, not all mobiles support GPS and network-based positioning does not require user's consent. Network-based positioning is known and multiple techniques have been proposed, which are mainly based on reported signal strength or time-delay measurements to estimate the mobile location.

A traditional approach is the trilateration based on Received Signal Strength (RSS), where the distance between the mobile and a measured Base Station (BS) is estimated by assuming certain propagation model. The mobile position is given by the intersection of the estimated distance of at least 3 BSs from different sites.

Another possibility is the multilateration based on Observed Time Difference Of Arrival (OTDOA), which estimates the difference in distance between the mobile and two measured BSs by using time-delay measurements. This is mathematically represented by a hyperbola. The mobile position is given by the intersection of at least 2 hyperbolas, so measurements of at least 3 BSs from different sites are required.

Another possibility is the use of Timing Advance (TA) or Propagation Delay (PD), which provides the distance to the service cell, combined with other techniques that estimate the Angle of Arrival (AoA), based, for instance, on comparing RSS differences to the antenna pattern.

Contrary to previous methods, which try to analytically find the mobile position, the fingerprinting consists of building a signal strength map based on collected measurements of the area of study either from GPS or by drive-test campaigns. The mobile position is given by finding the best match to the pre-calculated map. Such fitting can be performed through deterministic or probabilistic approaches.

The term "accuracy" is widely agreed as the Key Performance Indicator (KPI) to evaluate a positioning algorithm, but there is not a unique interpretation for it, so its definition plays here an essential role. At first sight, it seems reasonable to consider it point-to-point, e.g. error distribution (in meters) when tracking a certain user. However, from Small Cells Design point of view, what really matters is not the position of a punctual user, but an accurate overall view of signal strength and traffic in order to identify, for instance, areas with poor coverage or hotspots. It is obvious that very precise point-to-point positioning, i.e. few meters, will lead to very reliable coverage and traffic maps, but is also proved that a small random error, i.e. even lower than 80 m, for instance, due to granularity, leads to totally meaningfulness maps for Small Cells Design.

Unfortunately, such high precision at a reasonable cost becomes very unlike, unless GPS is considered, due the nature of RF measurements. Trilateration based on RSS is prone to fading, multipath, building losses and other propagation distortions. Accurate results would require a very complex propagation model able to capture all these features, which has been proven to be, apart from very time consuming and costly, not realistic for dense urban scenarios.

Regarding OTDOA, time-delay measurements are reported with granularity of 1 chip (i.e. ~78 m). In an asynchronous network, as UMTS, relative time difference between BSs must be recovered in advance. This is a very challenging task that adds uncertainty. Besides, multipath, especially relevant in dense urban scenarios, can severely distort these time-delay values. Finally, mathematical limitations of the trilateration algorithm, due to geometry and other factors, can make the solution fall into local minima.

Techniques using PD in UMTS are limited by availability because it is only sent at call establishment, and granularity, since it is reported in steps of 3 chips (i.e. ~274 m). In case of LTE (Long-Term Evolution), frequency and accuracy is higher, but still not enough, since TA is reported with 78 m granularity. Besides, estimating the AoA with enough precision is not trivial, so some extra uncertainty is expected.

Therefore, analytic models that rely on signal and/or time-delay measurements to estimate the user position are unable to provide, even under ideal conditions, enough accuracy for a Small Cells Design in dense urban scenarios. As an alternative, classic fingerprinting can improve accuracy, but requiring extensive surveying campaigns to collect data, which makes it very time consuming and costly.

Accordingly, a need exists to accurately determine a position of a mobile entity in a mobile communications network in order to be able to identify areas with poor coverage or hotspots without using satellite based positioning methods.

SUMMARY

This need is met by the features of the independent claims. Further aspects are described in the dependent claims.

According to a first aspect a method is provided for determining an adjusted position of a mobile entity in a area of the mobile communications network based on a reference position of the mobile entity in the area, wherein the area is divided into different pixels. According to one step of the method, the reference position of the mobile entity is determined in the area and for each pixel of the area a predicted signal level of a radio frequency field of the mobile communications network for the mobile entity is determined. Furthermore, a mobile traffic density is determined for each pixel of the area, the mobile traffic density indicating an expected density of the mobile traffic of the mobile communications network in the area. Furthermore, a probability matrix of the area is determined based on the reference position, the predicted signal level and the mobile density, wherein the probability matrix indicates a likelihood that the mobile entity is located in the corresponding pixel of the area. One of the pixels is then selected for the mobile entity based on the probability matrix and the selected pixel corresponds to the adjusted position of the mobile entity in the area.

By the statistic use of the predicted signal level and mobile traffic density in combination with a reference position, e.g. analytic positioning methods, a more precise position of a mobile entity can be determined. The invention smartly uses signal strength and user density information to highly increase the reliability of coverage and traffic maps for Small Cells Design without requiring a boost in the point-to-point accuracy. This is the concept on which the invention focuses on in order to provide a robust solution that can be easily combined with current positioning methods, and applied to any technology and vendor. When the position of the mobile entity is known more precisely, meaningful coverage or traffic maps can be determined. When the predicted signal level, the reference position and mobile user density are used, the reliability of positioning methods is highly increased. The invention allows determining the position at a similar level of detail as fingerprinting, but at a much lower cost, since complex propagation models or surveying campaigns to collect data are not necessary. The probability matrix is generated based on the expected user density, a reference position and other factors, such as a similarity between a reported and an estimated signal level. With the invention it is possible to find the most likely location of a mobile user entity in an uncertainty area which is due to the intrinsic accuracy of the method for determining the reference position.

Furthermore, the corresponding position adjusting unit is provided configured to determine the adjusted position, the position adjusting unit comprising a receiver configured to receive the reference position of the mobile entity in the area. Furthermore, a processing unit is provided configured to determine for each pixel of the area the predicted signal level and the mobile traffic density. The processing unit is then configured to determine a probability matrix of the area based on the reference position, the predicted signal level and the mobile traffic density as discussed above.

Furthermore, a computer program comprising program code to be executed by at least one processing unit of the position adjusting unit is provided, wherein the execution of the program causes the at least one processing unit to inter alia carry out the steps mentioned above. Additionally, a computer program product comprising the program code is provided.

The invention will be described in further detail below with reference to the accompanying drawings.

BRIEF DESCRIPTION OF THE DRAWINGS

FIG. 9 is a table indicating different mobile traffic densities for different sub-areas shown in FIG. 7.

DETAILED DESCRIPTION OF EMBODIMENTS

Exemplary embodiments of the present invention will be described with reference to the attached drawings.

Figure 1:
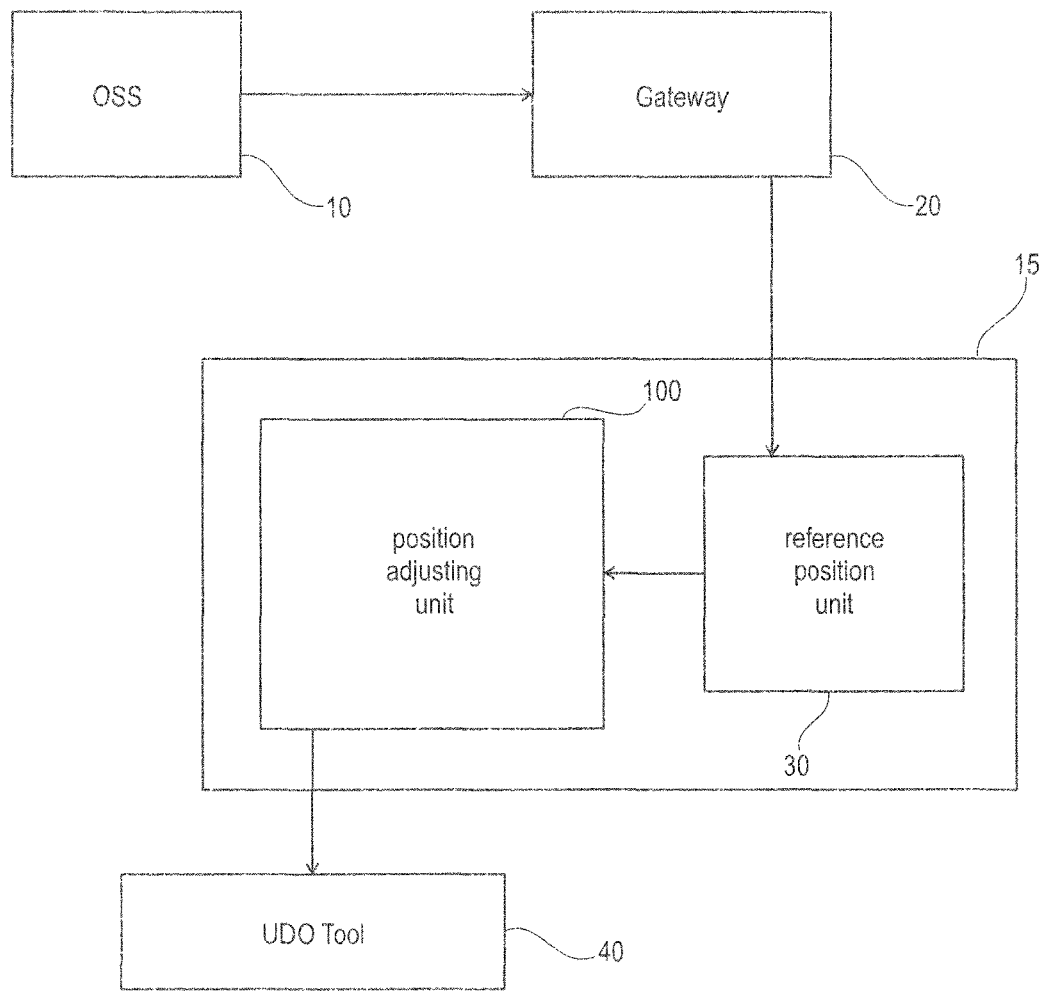
FIG. 1 is a schematic view of a system in which a position adjusting unit adjusts a position of a mobile entity provided by a reference position unit.
Figure 2:
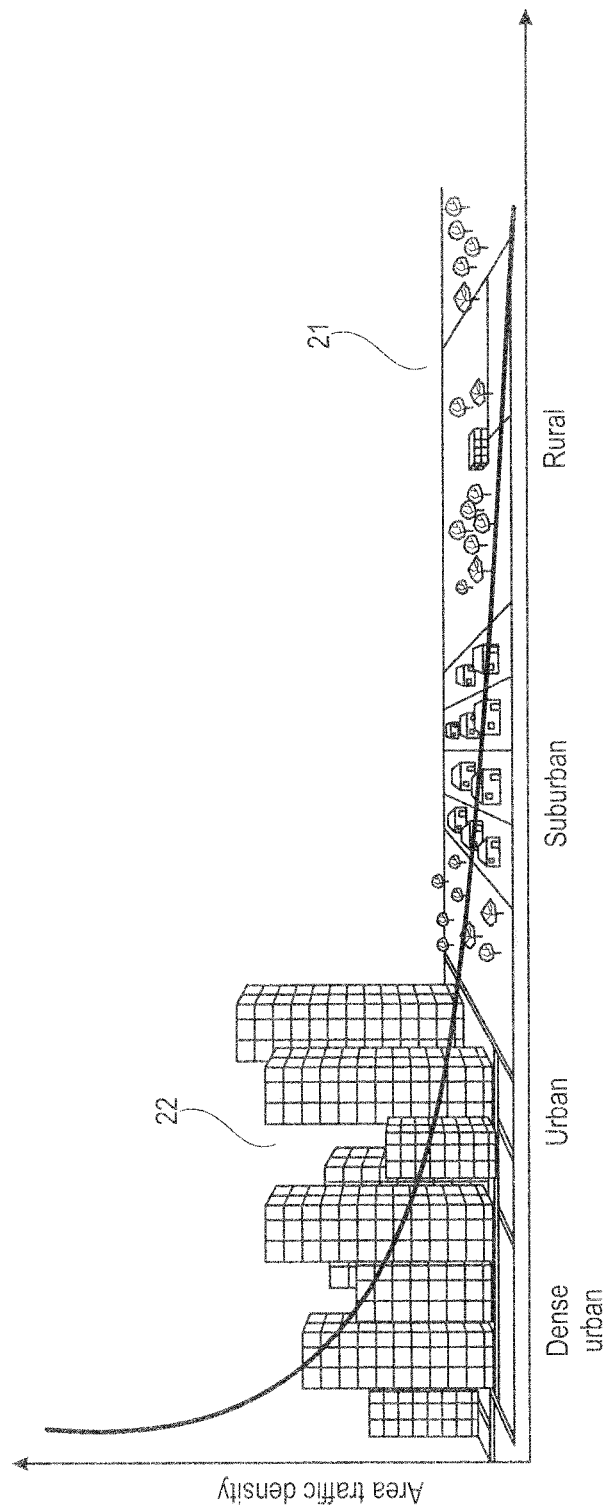
FIG. 2 shows an area traffic density based on different geographical regions.

FIG. 1 shows a schematic view in which context the present invention is used. An operation support system (OSS) 10 collects traces in a mobile communications network that contain, among others, radio resource control (RRC) measurement reports, which include a set of measured cells and their corresponding signal level for a given mobile entity in a certain time instant. An RRC measurement report is a standardized information by the 3GPP organization which is reported in 3G by the mobile entity, UE, either in an event-triggered manner, e.g. for soft handover purposes, or in a periodic manner if required by the operator of the mobile communications network. On the other hand, the OSS also contains a configuration management (CM) database with cell-related information (e.g. carrier, latitude, longitude, RNC (Radio Network Controller), azimuth) that is usually required for positioning algorithms. These measurement reports are transmitted to a data gateway 20 where the information is decoded and processed so that it can be used by a location engine 15 which includes a reference position unit 30 using an algorithm such as OTDOA in order to determine a reference position of the mobile entity. A position adjusting unit 100 then adjusts the determined reference position which was determined with a certain uncertainty as will be explained in more detail below. The adjusted position can then be transmitted to a network design and optimization (NDO) tool 40 where a set of collected RRC measurement reports placed at their adjusted position is used to generate coverage maps of an area and/or traffic maps. By way of example, when it is determined in a coverage map that a certain area of a mobile network has low coverage but the traffic map shows that high traffic is present in this area, the capacity may be improved in this area by adding a low-power node.

The invention comprises the generation of a probability matrix based on the expected user density, on the similarity between reported and estimated signal levels. The probability decays as long as the location gets further from the starting position given, i.e. the reference position, for instance by an analytic method. The invention helps to find the most likely location over an uncertainty area which is due to the intrinsic inaccuracy used for determining the reference position.

Figure 6:
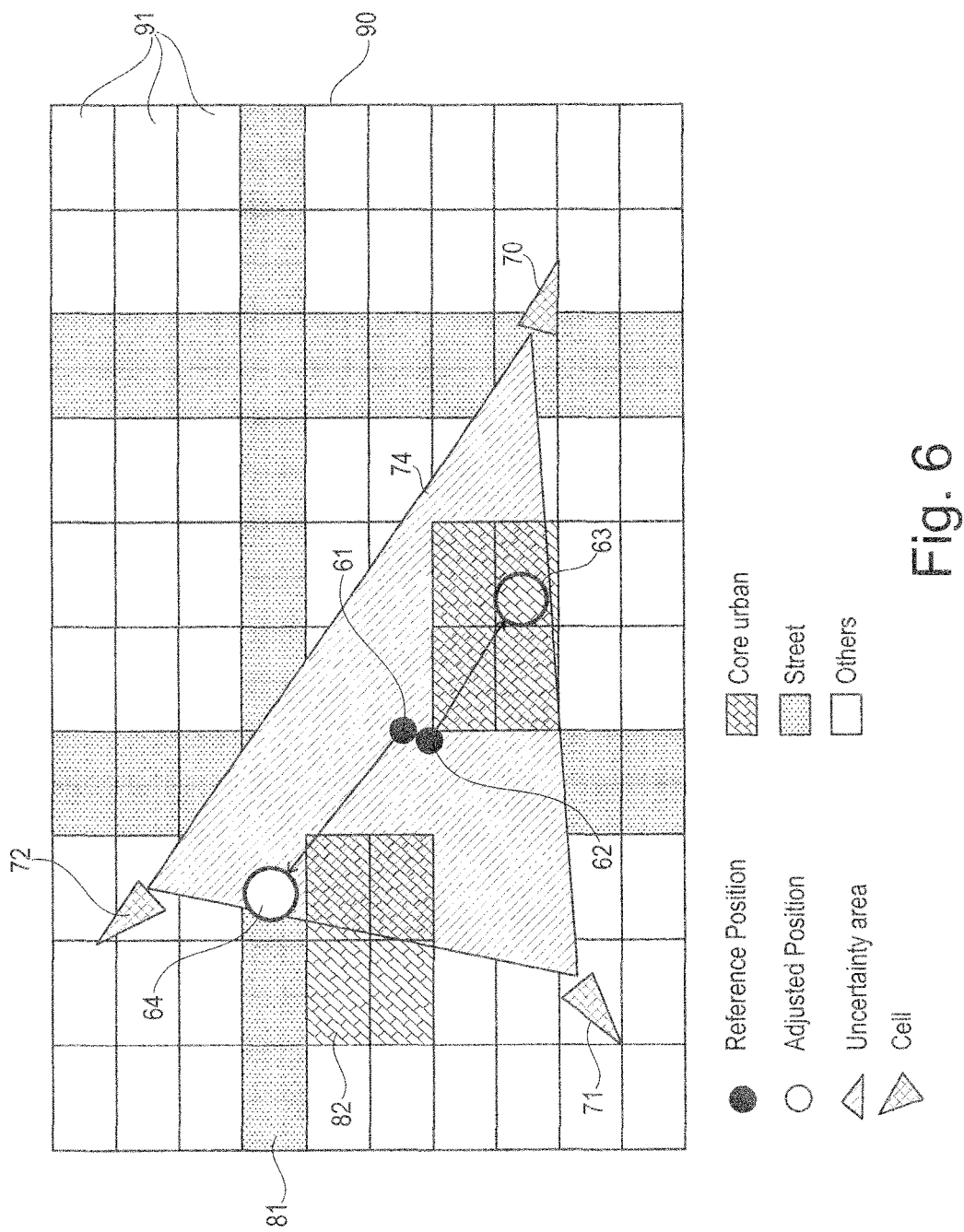
FIG. 6 is a schematic example of a reference position of a mobile entity that is adjusted to the adjusted position in an area of a mobile communications network.

The basic setup in such a scenario is shown in FIG. 6. Two mobile entities are located in an area in which they receive radio frequency signals from three different radio base stations/transceivers or cells 70, 71 and 72. Based on position determining methods described in the introductory part, e.g. using signal level reports provided by the network the reference position unit 30 can determine two reference positions for the two entities, here reference position 61 and reference position 62. Due to the accuracy resulting from the applied method an uncertainty area 74 is provided which indicates the area where the mobile entities can be actually located even though the method determines the reference positions 61 and 62. Based on the probability matrix, the determined reference position, a mobile traffic density and the predicted signal level, an adjusted position for each of the mobile entities can be calculated, the adjusted positions corresponding to positions 63 and 64 of FIG. 6. This means that based on the probability matrix the most likely location in the uncertainty area 74 for the two mobile entities is determined. In the example shown the most likely locations are the adjusted positions 63 and 64. The area 90 in which the mobile entity is located is divided into different pixels 91. In the present context the term "pixel" refers to a quantized location, as the area is divided into a limited number of elements, here the pixels 91, so that a matrix can be built. In other words the area is divided into different quantized locations or bins or discrete elements.

Figure 3:
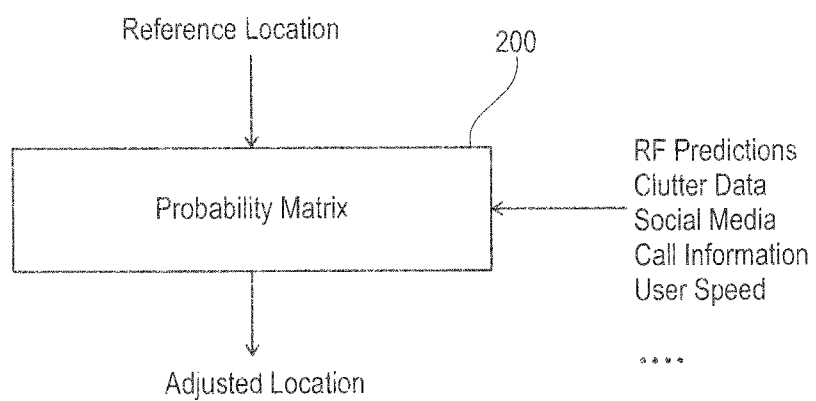
FIG. 3 shows a schematic view of how the probability matrix is determined based on different input data in order to determine the adjusted position of the mobile entity.

As indicated in FIG. 3, a probability matrix 200 is generated on top of the reference locations, such as the reference positions 61 and 62. The reference positions are used as a starting point to get the most likely position for each mobile entity. The probability matrix can be seen as a black box that receives different inputs (e.g. RF predictions, clutter data, social media data etc.) to determine the likelihood of each location according to the reported information.

Figure 4:
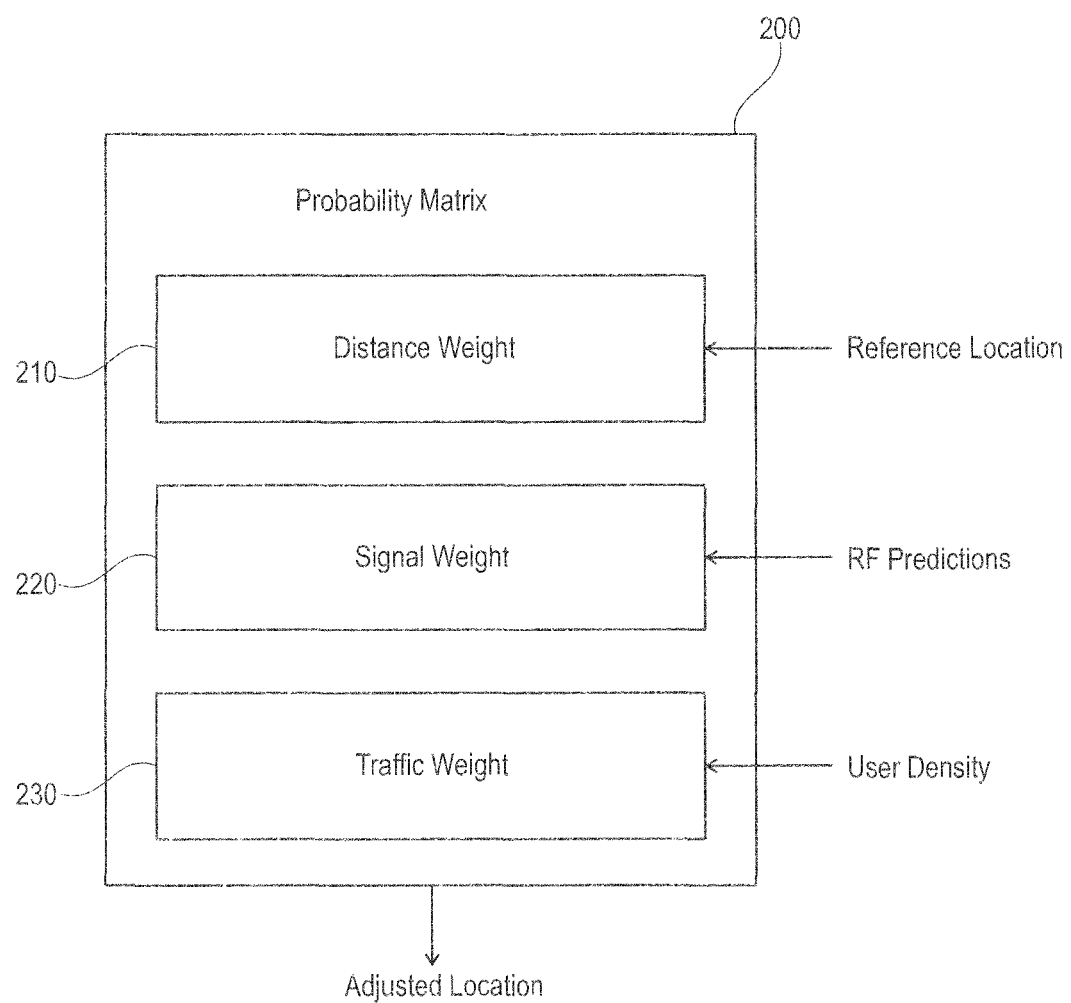
FIG. 4 shows a more detailed view of the probability matrix and its components used to determine the adjusted position.

The probability matrix 200 comprises the pixel weight for all pixels 91 of the area. The probability matrix uses the RF predictions and user density or mobile traffic density in the different pixels as main indicators, but other inputs may also be used, such as call awareness, the speed of the mobile entity in which it is moving, or position information obtained from social media data etc. As shown in more detail in FIG. 4, the probability matrix 200 is built as a joint of different weights. One weight is the distance weight 210 which, based on the reference position, provides a weight for each pixel 91, which describes the influence of the proximity of a possible location to the reference location. In addition to the distance weight 210, a signal weight 220 is calculated which represents the similarity between a reported signal level of the radio frequency signal as provided by the OSS 10 or gateway 20 and a predicted signal level. Furthermore, the probability matrix is based on a traffic weight 230 which describes the influence of a mobile traffic density in the different pixels of the area. Thus, the probability matrix contains an array including a weight for each pixel which is defined as a joint function of the different factors that impact the likelihood of the given location. In the embodiment of FIG. 4 the distance weight 210, signal weight 220 and traffic weight 230 are indicated. However, it should be understood that other weights may also be used in addition to the weights shown or the input to the different weights 210 to 230 may include additional parameters not shown. Based on the embodiment shown in FIG. 4, the following weight may be used:

$$W(i) = W_D(i) \cdot W_S(i) \cdot W_T(i) \quad (1)$$

where W(i) is the weight at the corresponding pixel i, $W_D$ is the distance weight, $W_S$ is the signal weight and $W_T$ is the traffic weight.

The distance weight pursues to model the impact of moving away from the reference location 61 or 62. The weight should decrease with the distance from the reference position. By way of example it can be defined as a Gaussian function:

$$W_D(i) = \exp\left[-\frac{1}{2}\left(\frac{d(i)}{\sigma_D}\right)^2\right] \quad (2)$$

where d(i) is the distance [km] between pixel i and the reference position and $\sigma_D$ is the distance standard deviation [km] which controls how fast the weight decreases with distance. These parameters depend on factors such as inter-site distance and confidence interval of the reference algorithm. The distance weight decays with the distance, meaning that the closer the pixel is to the reference location, the higher the weight of the corresponding pixel is.

The signal weight $W_S$ is based on RF predictions which are used for the reference position to distinguish signal decay with distance and to differentiate between indoor and outdoor. Very accurate propagation models such as ray-tracing may be used; however, the invention also works with a basic propagation model (e.g. an Okumura-Hata model, a slope-intercept propagation model, similar to equation (7)). Furthermore, certain data losses may be considered to take into account indoor behavior. The signal weight should capture the similarity between the reported signal level as reported by the network and the predicted signal level. It can also be defined as a Gaussian function:

$$W_s(i) = \exp\left[-\frac{1}{2}\left(\frac{\hat{S}_R - S(i)}{\sigma_S}\right)^2\right] \quad (3)$$

where $\hat{S}_R$ is the adjusted reported signal [dBm] from the strongest cell or base station, S(i) is the predicted signal level [dBm] at pixel i for the measured cell and $\sigma_S$ is the signal standard deviation [dBm] which controls how fast the weight decreases as the reported signal differs from the predicted value. The propagation models used for determining the predicted signal level can strongly differ from reality, and a direct mapping between the predicted and reported signals can lead to relevant errors. Thus, it is proposed to calibrate the reported signal to the predictions, so that $$S_R \to \hat{S}_R \quad (4)$$

where $\hat{S}_R$ is the adjusted reported signal [dBm]. A possible implementation is to calculate the cumulative density function (CDF) from all the mobile entities that report a cell as best-serving cell and the CDF from all the pixels where the cell is the best-serving cell, so that a reported signal level is adjusted through its corresponding percentile to predictions. The predictions are a guideline to distinguish between high and low signal level areas, e.g. indoor or outdoor. However, the estimation may not be very accurate, so that the direct search of a reported value in the predictions would lead to high errors. To minimize this error, a reported signal level is calibrated through the reported versus predicted CDFs as will be explained in connection with FIG. 12.

Figure 12:
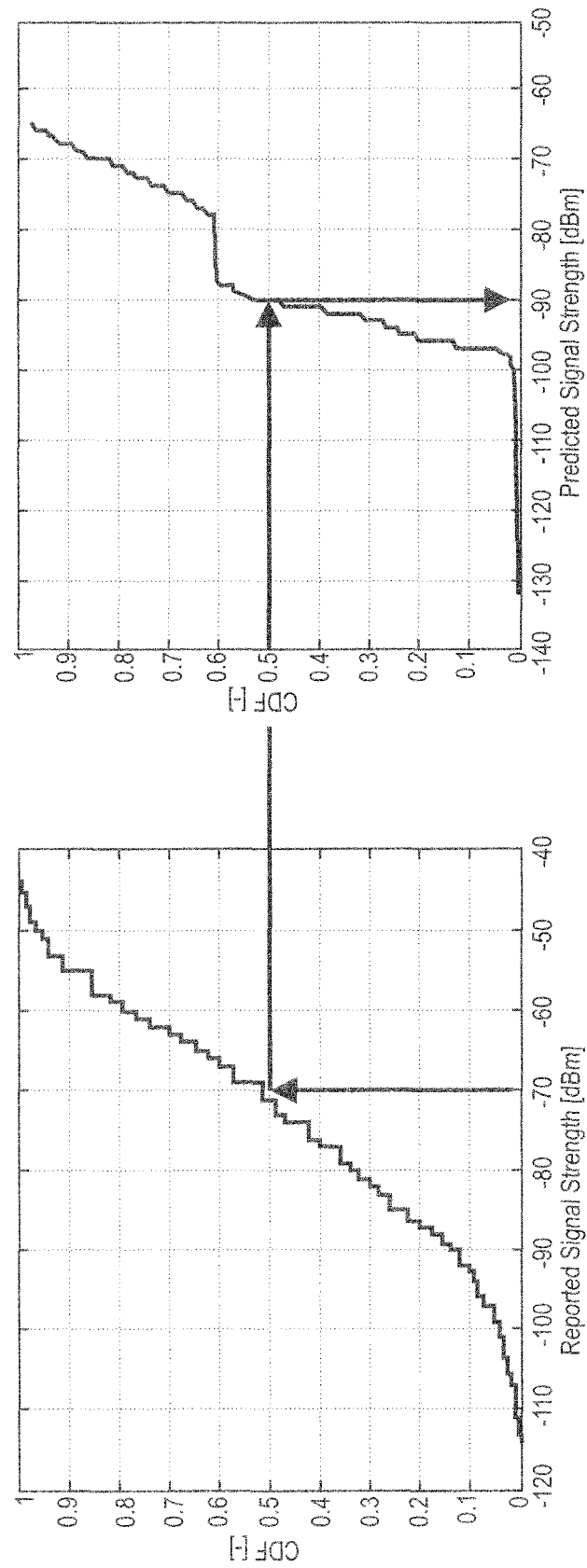
FIG. 12 is a schematic view how a reported signal level is calibrated to a predicted signal level when a signal weight is determined, the signal weight being used for determining the probability matrix.

In the left graph of FIG. 12 there is a distribution of reported signal levels for a given area and the distribution of the predicted signal levels for the same area (right side of FIG. 12). In the following example it is supposed that the mobile entity reports a signal of −70 dBm. As can be seen from FIG. 12, this corresponds to the $50^{th}$ percentile (pct). In the predicted distribution is corresponds to the $80^{th}$ pct. Stated differently, according to the reported information the measurement is just a middle value, while according to the predicted information it would be a rather high value. When the signal weight is calculated, this would lead to the effect that a higher likelihood is provided of placing the measurement in pixels with very high predicted signal. However, this would not correspond to reality, as the actual reported signal level values indicate that the measurement is just a middle value. To overcome this problem, a calibration is carried out which means that the $50^{th}$ pct is translated from the reported to the predicted distribution, so that the calibrated value is −90 dBm instead of −70 dBm. This −90 dBm would be the value that is used to calculate the signal weight.

Figure 7:
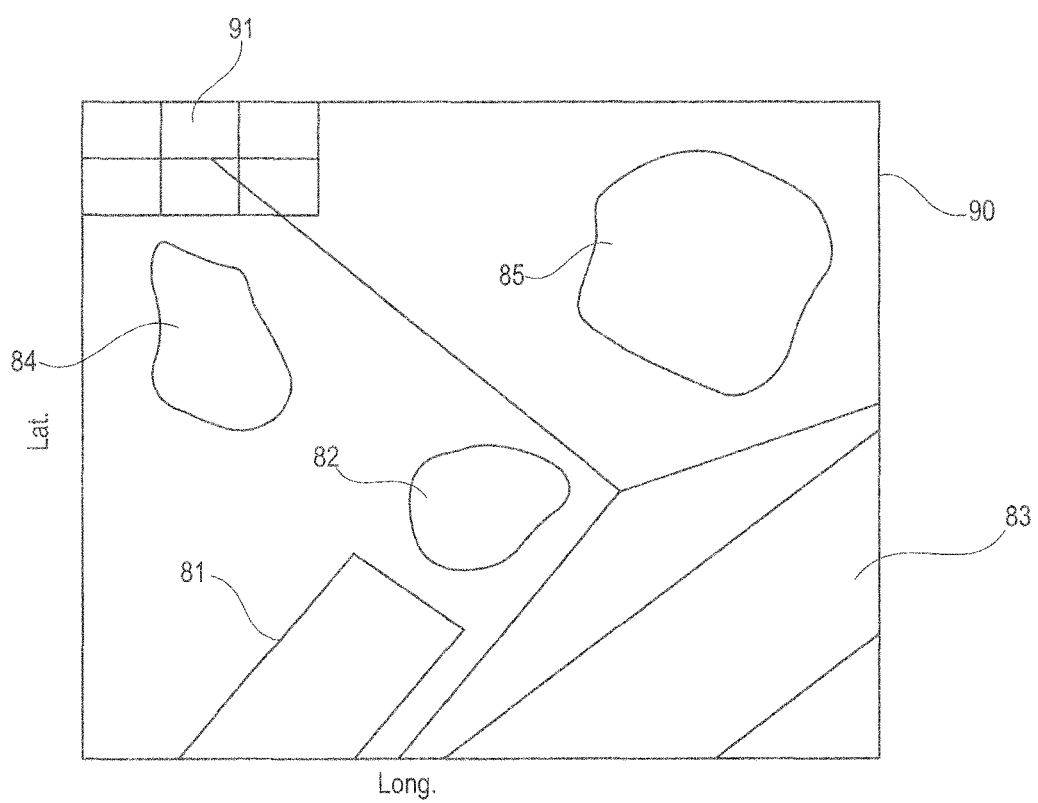
FIG. 7 is a schematic view of the area of FIG. 6 divided into different sub-areas with the different sub-areas having different mobile traffic densities.

The traffic weight $W_T$ describes the user density or the mobile traffic density which is used to distribute the traffic where it is expected. This weight can be populated with a heuristic clutter weight with e.g. higher weights in buildings and no weight in areas where no mobile entity can be expected, e.g. in waters. Furthermore, more accurate data may be used, so as social media data, e.g. Twitter or Instagram, from which it can be deduced where mobile entities may be located. In a very simple implementation the traffic weight at pixel $W_T(i)$ may be designed as an heuristic clutter weight. This is explained in more detail in connection with FIGS. 6, 7 and 9. As can be deduced from FIGS. 6 and 7, the area 90 can be divided into different types of sub-areas 81 to 85 and the traffic weight is assigned for the different sub-areas, wherein the traffic weight is proportional to the density of mobile entities expected in the corresponding sub-areas. With reference to the example shown in FIG. 7, the sub-area 81 may be a core urban sub-area with a high traffic density, sub-area 82 may be a suburban area with a slightly lower expected traffic density, area 84 may be an industrial area where also some traffic can be expected. However, area 83 may be a river, i.e. water area, where no or very low traffic density is expected, whereas area 85 may be a forest area also with a comparably low traffic density. The different clutter weights and the possible loss of signal in the corresponding sub-area is also summarized in the table shown in FIG. 9.

Making also reference to FIG. 6 the different sub-areas are also symbolized in FIG. 6, where some of the pixels are assigned to sub-area 81, whereas other pixels are assigned to sub-area 82, etc.

The probability matrix using the different weights discussed above is then used to determine the pixel weight which indicates the likelihood that the mobile entity is located in the different pixels. There are different possibilities to select the most suitable pixel for each reported signal level of a mobile entity. One option is to locate each reported signal level individually trying to preserve the statistic distribution given by the weight map represented by the probability matrix. Another more complex alternative would be to group samples by similarity and to make a joint function to locate them at once maximizing the likelihood. If the first approach is further prosecuted, the probability of pixel i is given by the following equation:

$$P(i) = \frac{W(i)}{\sum_{i=1}^{N} W(i)} \quad (5)$$

where N is the number of pixels. Furthermore, a random number Q uniformly distributed, which allows to assign samples proportionally to the pixel weight probability, is picked. P(i) i=1, . . . , N is the probability of each pixel in the area of study. As each measurement is located individually and to preserve the statistical distribution over the entire area, for each measurement, a pixel is selected randomly according to P(i). To do so, a number Q uniformly distributed between [0,1] is picked, and then pixel k is selected as described below:

$$\text{where } P(0) = 0. \sum_{k=0}^{i-1} P(k) < Q < \sum_{k=0}^{i} P(k) \quad (6)$$

Figure 5:
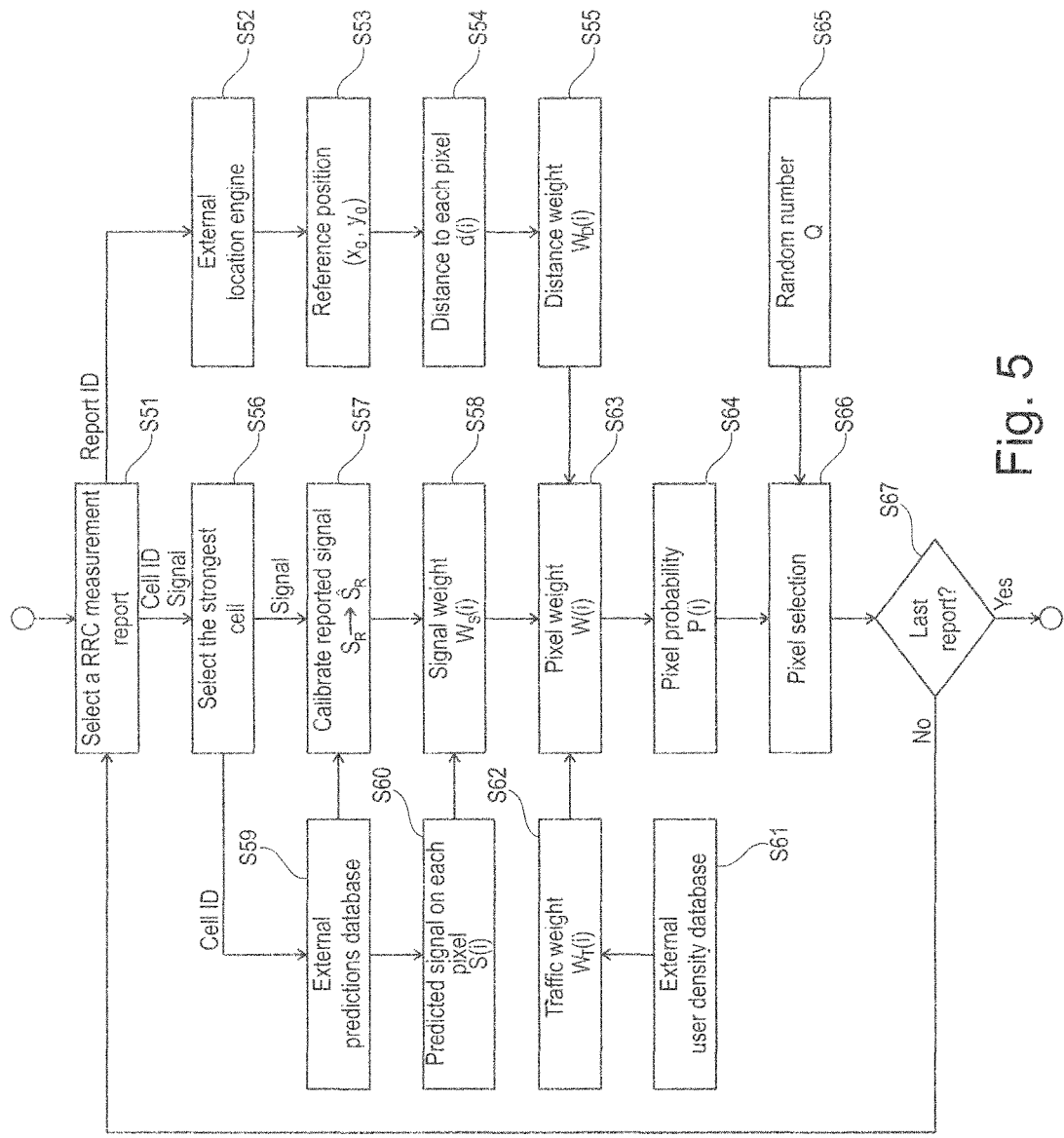
FIG. 5 is a schematic view of a flowchart including steps carried out by the position adjusting unit in order to determine the adjusted position.

FIG. 5 summarizes the steps carried out to adjust a reference position of a mobile entity to an adjusted position. In step S51 a report, e.g. an RRC measurement report, is selected, which contains a set of measured cells and their corresponding RF signal levels. In the following, the determination of the distance weight is explained. The report is transmitted to a location engine, e.g. the reference position unit 30 of FIG. 1 (step S52), where the reference position is determined. In step S53 resulting in the reference position ($x_0$, $y_0$) for the mobile entity. The reference position unit may use a positioning algorithm such as OTDOA in order to determine a reference position such as position 61 and 62 of FIG. 6, wherein the determination algorithm has an uncertainty as shown by area 74 in FIG. 6. In step S54, the distance of each pixel of the area to the reference position is calculated and the distance weight is estimated, e.g. using equation (2) mentioned above (step S55).

In the following the determination of the signal weight is explained in more detail. Based on the selected measurement report in step S51 the strongest cell and the corresponding RF signal level are selected from the report in step S56. Using an external prediction database it is possible to calibrate the reported signal and also to get a predicted signal level for each pixel. The external prediction database can be referred to as a collection of the expected signal level for each cell and pixel. By way of example this can be obtained using simple propagation models, e.g. Okumura-Hata or more advanced techniques, such a ray-tracing. The calibration of the reported signal was discussed above in connection with FIG. 12 (step S57). In step S58 the calibrated reported signal is compared to the predicted signal so that the signal weight can be estimated, e.g. as mentioned above by equation (3). In FIG. 5 the access to the external predictions database and the determination of the predicted signal level for each pixel in the database is symbolized by steps S59 and S60.

Furthermore, the traffic weight is used. As symbolized by step S61, a user density database is accessed, wherein this database may comprise a simple clutter map with its corresponding weights such as shown in FIG. 9. Additionally it is possible to use more accurate information, such as information provided by social media. Based on information in the user density database, the traffic weight $W_T(i)$ is determined in step S62.

Using the traffic weight, the signal weight and the distance weight it is then possible to calculate the signal weight W(i) as indicated by equation (1) (step S63). As described by equation (5) it is then possible to determine a pixel probability for each pixel (step S64) and one of the pixels is selected based on the pixel probability using the random number Q (steps S65 and S66). The above steps can then be repeated for all measurement reports and the different mobile entities can then be located at the adjusted position.

In the following, a possible implementation for the prediction database is discussed: The RF model comprises a standard slope-intercept propagation model, where pathloss [dB] at pixel i from cell j is calculated as follows:

$$L_{i,j} = \alpha_j + \beta_j \cdot \log_{10}(D_{i,j}) - A_{i,j} + \overline{\omega}_i \quad (7)$$

where $\alpha_j$ [dB] and $\beta_j$ [dB/dec] are the intercept and the slope of cell j, respectively, $D_{i,j}$ is the distance [km] from pixel i to cell j, $\omega_i$ is the clutter loss [dB] at pixel i and $A_{i,j}$ is the antenna gain [dB] at pixel i from cell j defined as:

$$A_{i,j} = A_j - \min\left(12 \cdot \left(\frac{\theta_{i,j} - \theta_j}{H_j}\right)^2, R_j\right) \text{ where } -180 \leq \theta_{i,j} - \theta_j \leq 180 \quad (8)$$

where $A_j$ is the maximum antenna gain [dB] at cell j, $R_j$ is the antenna front to back ratio [dB] at cell j, $H_j$ is the antenna half power beam [deg] at cell j, $\theta_{i,j}$ is the angle [deg] between pixel i and cell j and $\theta_j$ is the azimuth [deg] of cell j. The exact values for the different parameters will depend on the scenario. Some default values may be $\alpha_j$=128 dB, $\beta_j$=38 dB/dec, $H_j$ 70 deg, $R_j$ 25 dB, $A_j$ 17 dB.

The actual RF conditions are generated using a randomized version of such propagation model to emulate a realistic scenario, so that:

Each sector has a different propagation slope [dB/dec] calculated as Gaussian variable, so that:

$$\beta_i \rightarrow N(\mu=38, \sigma=8)$$

Each pixel has a different clutter loss [dB] calculated as Gaussian variable, so that:

$$\overline{\omega}_i > N(\mu=X_i, \sigma=8)$$

where $X_i$ is the reference clutter loss at pixel i, as FIG. 9 indicates.

The clutter loss per pixel $\omega_i$ is defined as a matrix where the value of each element depends on the clutter type at the corresponding location. The clutter loss is indicated in FIG. 9 in the middle column in one example.

Similarly, the traffic distribution is generated by dropping million samples (i.e. emulating measurement reports collected in traces) over the area of interest proportionally to the clutter weights defined as a Gaussian variable below:

$$c_i \rightarrow \max\left(0, N\left(\mu = C_i, \sigma = \frac{1}{3} \cdot C_i\right)\right) \quad (9)$$

where $C_i$ is the reference clutter weight at pixel i as indicated in FIG. 9. The cells and their associated signal strength measurements that each sample includes are defined by the strongest set of cells within a 10 dB value. Other configuration parameters are $\sigma_D$=0.026 km and $\sigma_S$=5 dBm.

Figure 8:
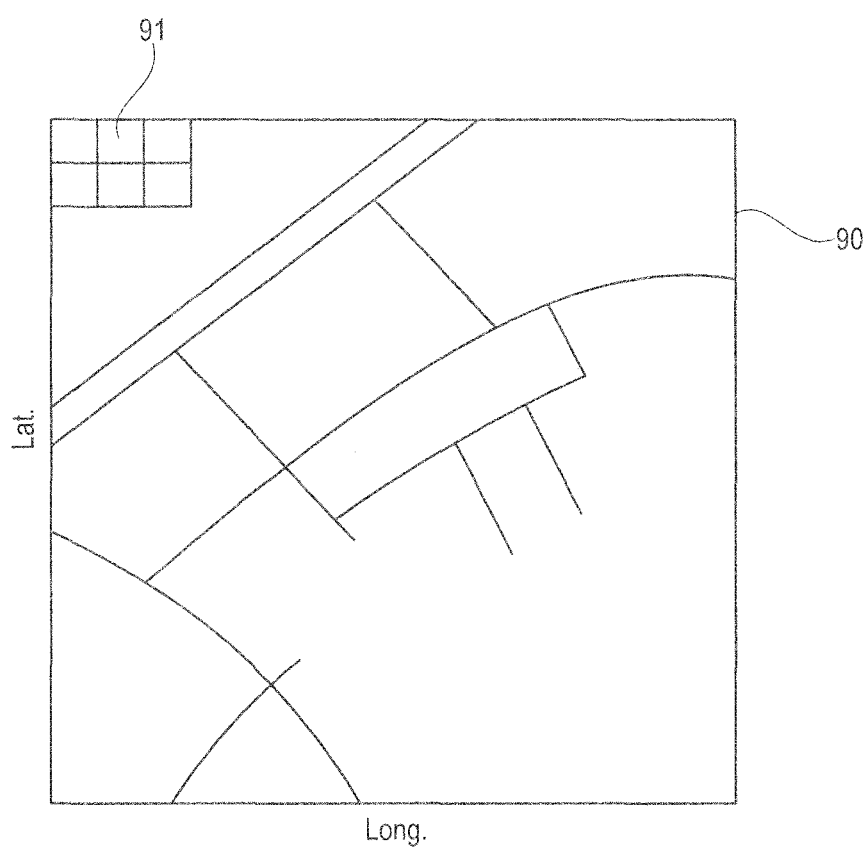
FIG. 8 is a schematic view of an area divided into different pixels for which coverage maps and traffic maps can be generated.
Figure 10:
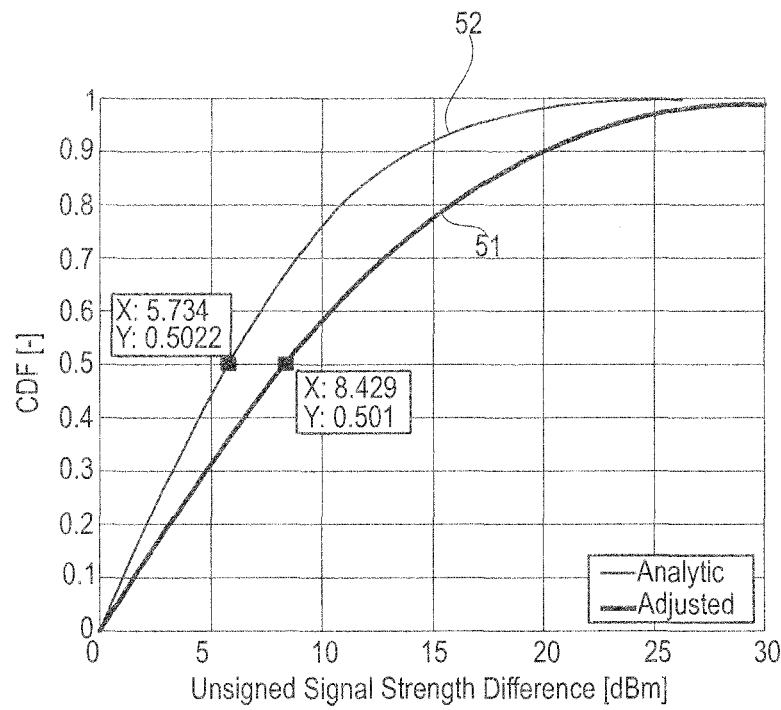
FIG. 10 shows a comparison of the accuracy obtained by methods of the prior art and of the present invention.
Figure 10:
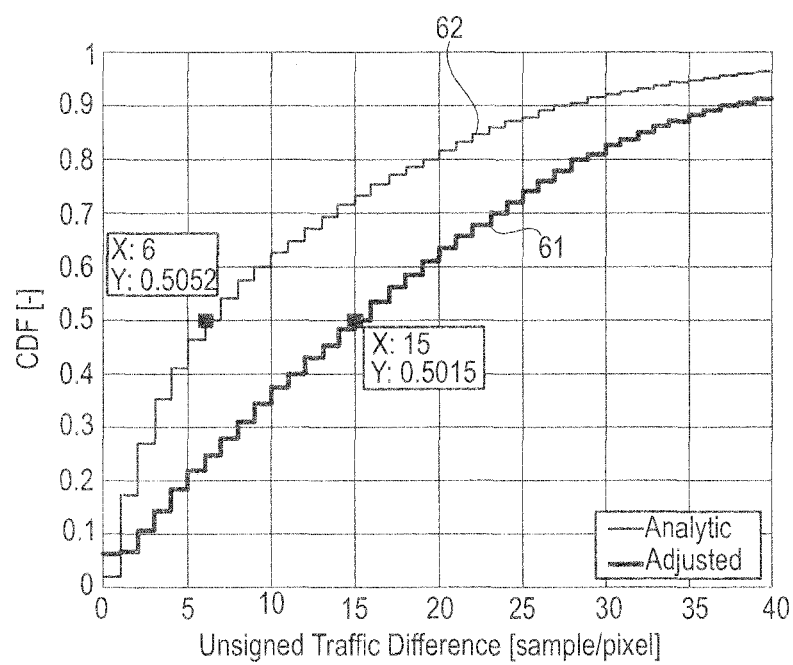

The position adjustment of the invention uses as an input a reference position as well as some RF predictions and clutter attributes to adjust each measured signal level to the most likely location. The reference position is calculated as discussed above and RF predictions and clutter weights are generated as also discussed above, but without the random component, i.e. just the standard model, to highlight the fact that there exists a difference between the actual propagation and the input predictions. The invention provides a much more reliable position so that better maps for signal strength or maps for traffic can be generated. FIG. 8 shows the area of a geographical map. With the invention it is possible to more precisely locate the mobile entities in the map, so that a signal strength map with longitude and latitude values can be generated which indicates where in the area 90 high-signal levels or low-signal levels can be expected. Furthermore, for the same area 90 a traffic map can be generated based on the adjusted user positions. The traffic map can then be compared to the signal strength map and if an area can be identified in the signal strength map where the signal strength is low, but where a high traffic is occurring, the corresponding area can be identified as an area where the operator has to improve the network. This is confirmed by FIG. 10 which shows the signal strength difference and traffic difference in dependence on the cumulative density function CDF. FIG. 10 shows a 32% and a 60% improvement in the median for signal strength in traffic maps in the studied area, wherein curves 51 and 61 are the analytic curves and curves 52 and 62 being the adjusted curves.

From the above discussion some general conclusions can be drawn. By way of example for determining the adjusted position the determination of the probability matrix comprises the step of determining a distance weight for each pixel of the area, wherein the distance weight takes into account the distance of each pixel to the reference position with the distance weight decaying with the increasing distance of the corresponding pixel to the reference position.

Furthermore, for determining the probability matrix the signal weight is determined for each pixel taking into account the signal difference between the reported radio frequency signal level reported by the mobile communications network and the predicted signal level. Here the signal weight increases for a pixel when the signal difference decreases in the corresponding pixel.

Furthermore, a traffic weight is determined for the probability matrix for each pixel, the traffic weight taking into account the mobile traffic density in the different pixels. The traffic weight increases in a pixel when the mobile traffic density increases in the corresponding pixel. Based on the probability matrix, the pixel weight can be determined for each pixel of the area, wherein the pixel weight indicates the likelihood of a location of the mobile entity in each of the pixels.

The pixel weight is then determined based on at least one of the distance weight, signal weight and traffic weight. Preferably, the pixel weight is determined based on the distance weight, signal weight and traffic weight.

Furthermore, the adjusted position is determined for plurality of mobile entities in the area and the adjusted position is determined for each of the mobile entities preserving the statistical distribution of the mobile entities given by the pixel weight determined for each of the mobile entities. This means that when 100 mobile entities have to be distributed over the different pixels, the mobile entities may be distributed over the pixels following the pixel weight for the corresponding pixels, meaning that if the pixel weight is 0.5 that around 50% or 50 mobile entities are located in one pixel, whereas if the pixel weight in another pixel is 0.1, around 10 out of the 100 mobile entities are located in the corresponding pixel.

The area can furthermore be divided into different types of geographical sub-areas. The traffic weight is then assigned to each sub-area in such a way that the traffic weight is proportional to the density of the mobile entities expected in the corresponding sub-areas.

Furthermore, the reported radio frequency signal level is provided by different cells of the network and the highest signal level is used as the reported radio frequency signal level for determining the signal weight. Furthermore, it is possible that the reported signal level is calibrated to the predicted signal level before the signal difference is determined as discussed above in connection with FIG. 12.

Figure 11:
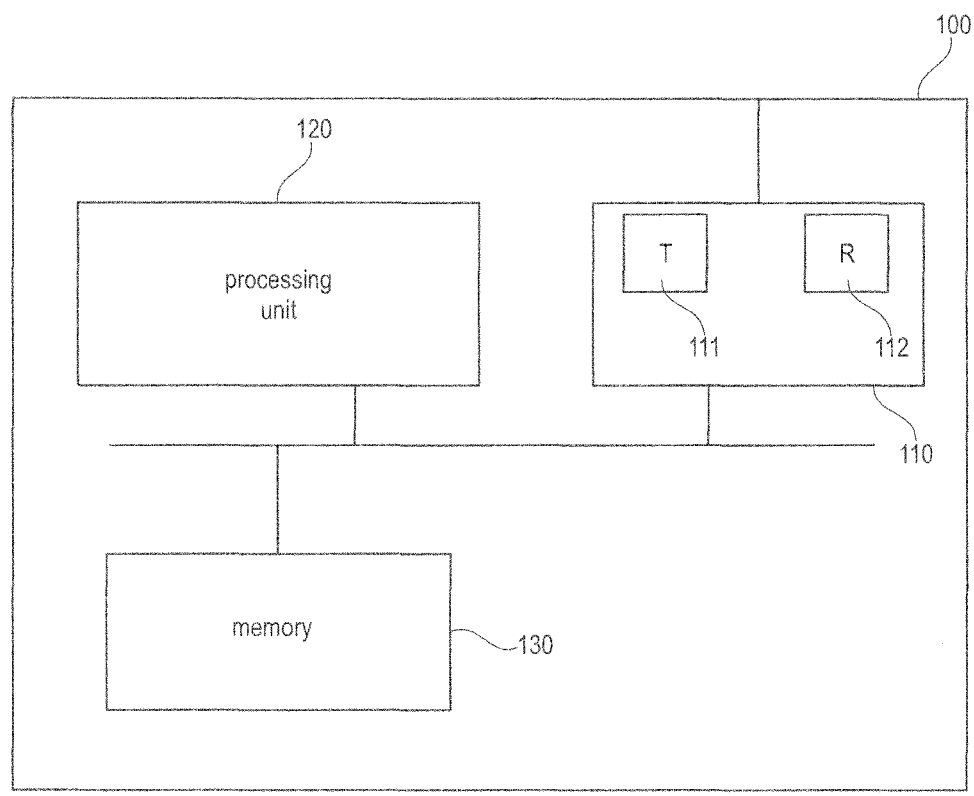
FIG. 11 is a schematic view of a position adjusting unit determining an adjusted position of the mobile entity.

FIG. 11 shows a schematic view of the position adjusting unit 100. The adjusting unit 100 comprises an input/output module 110 with a transmitter 111 and a receiver 112. The input/output module symbolizes the possibility of the position adjusting unit to communicate with other nodes or entities of the network, the transmitter 111 providing the possibility to transmit control messages or user data to other entities, the receiver 112 symbolizing the possibility to receive control messages or user data from other entities. A processing unit 120 is provided comprising one or more processors which are responsible for the operation of the position adjusting unit 100. The processing unit 120 can generate the commands that are needed to carry out the above-discussed procedures in which the position adjusting unit is involved. A memory 113 such as a read-only memory, a flash memory, a random access memory, a mass storage or the like can store suitable program codes to be executed by the processing unit 120 so as to implement the above-described functionalities of the position adjusting unit.

It should be understood that the functional modules shown in FIG. 11 are merely schematic and that the position adjusting unit may include further components which are not indicated for the sake of clarity. By way of example an input element for user input or a display may be provided with which an operator can control the position adjusting unit. The functional entities shown in FIG. 11 may be incorporated into a single entity or the separation of the functional entities may be different to the embodiment shown. Furthermore, the entities may be incorporated by hardware, software or a combination of hardware and software.

The statistic use of RF predictions and user density which is combined with analytic positioning methods is one aspect of the invention in order to provide more meaningful coverage in traffic maps for Small Cells Design. The invention allows indoor/outdoor differentiation, better cell coverage fingerprints using e.g. a signal strength decay with distance taking into account the absence of traffic in unlikely locations such as rivers or lakes. The method for determining the adjusted position includes, based on a reference position, the expected user density and a similarity between a calibrated version of the reported measurement, adapted to the RF predictions' space, and the estimated signal level in order to get the most likely location for each mobile entity. This invention allows acquiring similar resolution as fingerprinting, but at a much lower cost, since it does not require complex propagation models or surveying campaigns.

With improved traffic or coverage maps it is possible to differentiate between indoor and outdoor areas. Classic fingerprinting methods only rely on signal strength, whereas the invention also considers traffic density estimation as input, which helps to more accurately capture the actual traffic patterns. Furthermore, it has been shown that with basic RF predictions plus clutter data it is possible to provide useful maps for Small Cell Designs without the need of complex propagation models or time-consuming and costly drive-test campaigns. The invention can furthermore be adapted to any current implementation and is compatible with any technology minimizing the costs of its deployment.

Furthermore, the method establishes independent blocks so that it can be smoothly adapted to new parameters, such as social media, and the weight definition can be customized to improve the reliability of the probability matrix.

The invention claimed is:

1. A method for determining an adjusted position of a mobile entity in an area of a mobile communications network based on a reference position of the mobile entity in the area, the area being divided into different pixels, the method comprising:
   determining the reference position of the mobile entity in the area;
   determining, for each pixel of the area, a predicted signal level of a radio frequency field of the mobile communications network for the mobile entity;
   determining, for each pixel of the area, a mobile traffic density indicating an expected density of the mobile traffic of the mobile communications network in the area,
   determining, for the area, a probability matrix of the area based on the reference position, the predicted signal level and the mobile traffic density, the probability matrix indicating a likelihood that the mobile entity is located in the corresponding pixel of the area,
   selecting one of the pixels for the mobile entity based on the probability matrix, the selected pixel corresponding to the adjusted position of the mobile entity in the area.

2. The method according to claim 1, wherein determining the probability matrix comprises determining a distance weight for each pixel of the area, wherein the distance weight takes into account that the distance of each pixel to the reference position decays with the distance of the corresponding pixel to the reference position.

3. The method according to claim 1, wherein determining the probability matrix comprises determining a signal weight for each pixel, taking into account a signal difference between a reported radio frequency signal level reported by the mobile communications network and the predicted signal level, wherein the signal weight increases for one of the pixels when the signal difference decreases in said one pixel.

4. The method according to claim 3, wherein the reported radio frequency signal level is provided by different cells of the mobile communications network, wherein the highest signal level is used as the reported radio frequency signal level for determining the signal weight.

5. The method according to claim 3, wherein the reported signal level is calibrated to the predicted signal level before the signal difference is determined.

6. The method according to claim 1, wherein determining the probability matrix comprises determining a traffic weight for each pixel, taking into account the mobile traffic density in the different pixels, wherein the traffic weight increases in one of the pixels with the mobile traffic density in said one pixel.

7. The method according to claim 6, wherein the area is divided into different types of geographical sub-areas, wherein the traffic weight is assigned to each sub-area in such a way that the traffic weight is proportional to a density of mobile entities expected in the corresponding sub-areas.

8. The method according to claim 1, further comprising determining a pixel weight for each pixel of the area based on the probability matrix, the pixel weight indicating a likelihood of the location of the mobile entity in each of the pixels.

9. The method according to claim 8, wherein the pixel weight is determined for each pixel based on at least one of a distance weight, a signal weight and a traffic weight for the pixel, wherein the distance weight takes into account that the distance of each pixel to the reference position decays with the distance of the pixel to the reference position, the signal weight takes into account a signal difference between a reported radio frequency signal level reported by the mobile communications network and the predicted signal level of the pixel, and the traffic weight takes into account the mobile traffic density in the different pixels.

10. The method according to claim 8, wherein the adjusted position is determined for a plurality of mobile entities in the area, wherein the adjusted position is determined for each of the mobile entities, preserving a statistical distribution of the mobile entities given by the pixel weights determined for each of the mobile entities.

11. A position adjusting unit configured to determine an adjusted position of the mobile entity in an area of a mobile communications network based on a reference position of the mobile entity in the area, the area being divided into different pixels, comprising:
   a receiver circuit configured to receive the reference position of the mobile entity in the area;
   a processing circuit configured to:
      determine, for each pixel of the area, a predicted signal level of a radio frequency field of the mobile communications network for the mobile entity; and
      indicate an expected density of the mobile traffic of the mobile communications network in the area;
      determine a probability matrix of the area based on the reference position, the predicted signal level and the mobile traffic density, the probability matrix indicating a likelihood that the mobile entity is located in the corresponding pixel of the area; and
      select one of the pixels for the mobile entity based on the probability matrix, the selected pixel corresponding to the adjusted position of the mobile entity in the area.

12. The position adjusting unit according to claim 11, wherein the processing circuit, for determining the probability matrix, is configured to determine a distance weight for each pixel of the area, the distance weight taking into account the distance of each pixel to the reference position.

13. The position adjusting unit according to claim 12, wherein the receiver circuit is configured to receive a reported radio frequency signal level provided by different cells of the mobile communications network, the processing circuit being configured to use the highest signal level as the reported radio frequency signal level for determining the signal weight.

14. The position adjusting unit according to claim 11, wherein the processing circuit, for determining the probability matrix, is configured to determine a signal weight for each pixel of the area, taking into account a signal difference between a reported radio frequency signal level reported by the mobile communications network and the predicted signal level.

15. The position adjusting unit according to claim 11, wherein the processing circuit, for determining the probability matrix, is configured to determine a traffic weight for each pixel, taking into account the mobile traffic density in the different pixels.

16. The position adjusting unit according to claim 11, wherein the processing circuit is configured to determine a pixel weight for each pixel of the area based on the probability matrix, the pixel weight indicating a likelihood of the location of the mobile entity in the different pixels.

17. The position adjusting unit according to claim 16, wherein the processing circuit is configured to determine the adjusted position for a plurality of mobile entities in the area, wherein the processing circuit is configured to determine the adjusted position for each of the mobile entities, preserving a statistical distribution of the mobile entities given by the pixel weights determined for each of the mobile entities.

18. A non-transitory computer readable medium storing a computer program for determining an adjusted position of a mobile entity in an area of a mobile communications network based on a reference position of the mobile entity in the area, the area being divided into different pixels, the computer program comprising program code to be executed by at least one processing unit of a position adjusting unit of a mobile communications network, wherein execution of the program causes the at least one processing unit to:
   determine the reference position of the mobile entity in the area;
   determine, for each pixel of the area, a predicted signal level of a radio frequency field of the mobile communications network for the mobile entity;
   determine, for each pixel of the area, a mobile traffic density indicating an expected density of the mobile traffic of the mobile communications network;
   determine, for the area, a probability matrix based on the reference position, the predicted signal level and the mobile traffic density, the probability matrix indicating a likelihood that the mobile entity is located in the corresponding pixel of the area; and
   select one of the pixels for the mobile entity based on the probability matrix, the selected pixel corresponding to the adjusted position of the mobile entity in the area.

* * * * *